US012670296B2

(12) United States Patent
Michel et al.

(10) Patent No.:  US 12,670,296 B2
(45) Date of Patent:       Jun. 30, 2026

(54) GENERATING A REQUEST FOR REPROCESSING OF A REPLACEABLE SUPPLY COMPONENT

(71) Applicant: Hewlett-Packard Development Company, L.P., Spring, TX (US)

(72) Inventors: Kyle Michel, Vancouver, WA (US); Laurent Pizot, Vancouver, WA (US); Jefferson P. Ward, Vancouver, WA (US); Steven T. Castle, Corvallis, OR (US); Talal Sadak, Vancouver, WA (US); Scott A. Putz, Boise, ID (US); Gabriel Scott McDaniel, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 198 days.

(21) Appl. No.: 18/276,554

(22) PCT Filed: Feb. 12, 2021

(86) PCT No.: PCT/US2021/017901
§ 371 (c)(1),
(2) Date: Aug. 9, 2023

(87) PCT Pub. No.: WO2022/173443
PCT Pub. Date: Aug. 18, 2022

(65) Prior Publication Data
US 2024/0111905 A1      Apr. 4, 2024

(51) Int. Cl.
*G06F 21/64*        (2013.01)
*B41J 2/175*        (2006.01)
(Continued)

(52) U.S. Cl.
CPC .......... *G06F 21/64* (2013.01); *B41J 2/17546* (2013.01); *G06F 21/606* (2013.01); *H04L 63/0876* (2013.01)

(58) Field of Classification Search
CPC ... G06F 21/64; H04L 63/0876; B41J 2/17546
See application file for complete search history.

(56) References Cited

U.S. PATENT DOCUMENTS

| | | | |
|---|---|---|---|
| 8,069,478 B2 | 11/2011 | Cho et al. | |
| 8,602,536 B1 | 12/2013 | Sarnoff et al. | |

(Continued)

FOREIGN PATENT DOCUMENTS

| | | |
|---|---|---|
| CN | 106462577 A | 2/2017 |
| CN | 107005413 A | 8/2017 |

OTHER PUBLICATIONS

"Solving Your Firmware Problem 68% Faster! How Come?", G&G News, ggimage.com, Nov. 5, 2020, Nov. 5, 2020, pp. 2.

(Continued)

*Primary Examiner* — David J Pearson
(74) *Attorney, Agent, or Firm* — Foley & Lardner LLP

(57) ABSTRACT

Generating a request for reprocessing of a replaceable supply component may include sending to a non-volatile memory of a replaceable supply component, a request for information about the replaceable supply component. The method may include receiving from the replaceable supply component, the supply component information, wherein the supply component information includes data to be decrypted by an exchange service. The method may further include generating a request blob including the supply component information, and cryptographically signing the request blob for sending to the exchange service for reprocessing of the replaceable supply component.

15 Claims, 4 Drawing Sheets

(51) Int. Cl.
    *G06F 21/60* (2013.01)
    *H04L 9/40* (2022.01)

(56) References Cited

U.S. PATENT DOCUMENTS

| | | | |
|---|---|---|---|
| 9,304,435 B2 | 4/2016 | Thacker et al. | |
| 9,811,037 B2 | 11/2017 | Jeran et al. | |
| 9,980,140 B1* | 5/2018 | Spencer | H04W 12/02 |
| 2002/0140966 A1 | 10/2002 | Meade et al. | |
| 2004/0117625 A1* | 6/2004 | Grawrock | H04L 9/0877 |
| | | | 713/168 |
| 2005/0119604 A1* | 6/2005 | Bonney | A61M 15/0083 |
| | | | 604/19 |
| 2005/0172118 A1 | 8/2005 | Nasu | |
| 2006/0015945 A1* | 1/2006 | Fields | G06F 21/6209 |
| | | | 726/27 |
| 2006/0029400 A1* | 2/2006 | Nasu | H04L 9/0894 |
| | | | 399/109 |
| 2006/0127711 A1* | 6/2006 | Kaschmitter | H01M 8/04186 |
| | | | 429/515 |
| 2008/0071605 A1* | 3/2008 | Asauchi | G06Q 30/06 |
| | | | 705/308 |
| 2008/0098380 A1 | 4/2008 | Klusmeyer | |
| 2009/0222886 A1* | 9/2009 | Lee | G06F 21/71 |
| | | | 726/2 |
| 2011/0205586 A1 | 8/2011 | Takahashi et al. | |
| 2013/0054968 A1* | 2/2013 | Gupta | H04L 63/083 |
| | | | 713/168 |
| 2013/0227267 A1 | 8/2013 | Senda | |
| 2014/0169803 A1* | 6/2014 | Lee | G03G 15/55 |
| | | | 399/12 |
| 2014/0270813 A1* | 9/2014 | Ignatchenko | B41J 2/17546 |
| | | | 399/27 |
| 2015/0089630 A1* | 3/2015 | Lee | B41J 29/38 |
| | | | 726/16 |
| 2015/0234621 A1 | 8/2015 | Kimura | |
| 2015/0278245 A1 | 10/2015 | Sagar et al. | |
| 2016/0119318 A1 | 4/2016 | Zollinger et al. | |
| 2016/0365981 A1* | 12/2016 | Medvinsky | G06F 21/57 |
| 2017/0163417 A1 | 6/2017 | Mclean et al. | |
| 2020/0371730 A1* | 11/2020 | Miyazaki | G06F 3/1284 |
| 2021/0146694 A1* | 5/2021 | Wagener | G06F 21/45 |

OTHER PUBLICATIONS

CHIPJET; "ChipStation | the Intelligent Firmware Upgrade Manager at Your Side", Nov. 24, 2020, pp. 5.
Michael, D., "Understanding the Switch Microchip", InkHub.com.au, Sep. 17, 2020, pp. 1.
Shujun, Z., et al., "Tutorial on APP Development Based on HTML5", Beijing Institute of Technology Press, Nov. 30, 2016, 9 pages(Including English Translation).

* cited by examiner

100

SENDING TO A NON-VOLATILE
MEMORY A REQUEST FOR
INFORMATION ABOUT THE
REPLACEABLE SUPPLY
COMPONENT
101

RECEIVING FROM THE
REPLACEABLE SUPPLY
COMPONENT, THE SUPPLY
COMPONENT INFORMATION
103

GENERATING A REQUEST
BLOB INCLUDING THE
SUPPLY COMPONENT
INFORMATION
105

CRYPTOGRAPHICALLY
SIGNING THE REQUEST
BLOB FOR SENDING TO
THE EXCHANGE SERVICE
107

409

NON-TRANSITORY COMPUTER-READABLE STORAGE MEDIUM          413

GENERATE A REQUEST BLOB INCLUDING A REQUEST TO REPROCESS A REPLACEABLE SUPPLY COMPONENT USING THE COMPUTING DEVICE          423

PROCESSOR          411

CRYPTOGRAPHICALLY SIGN THE REQUEST BLOB          425

SEND THE REQUEST BLOB TO AN EXCHANGE SERVICE          427

RECEIVE A RESPONSE BLOB FROM THE EXCHANGE SERVICE          429

GENERATING A REQUEST FOR REPROCESSING OF A REPLACEABLE SUPPLY COMPONENT

BACKGROUND

Various types of devices include replaceable supply components, such as inkjet printhead assemblies, and print material containers for two-dimensional (2D) or three-dimensional (3D) printing devices, for example. Example print material containers include inkjet cartridges, toner cartridges, ink supplies, and build material supplies, among others. In some cases, such supply components include integrated circuits, which may be referred to as chips, to communicate with electronic circuitry of the device in which they are installed. While replaceable supply components may be relevant to printing, replaceable supply components may be used in other contexts, such as in the field of biomedical devices for testing fluids and fluid dispensing and/or other material dispensing devices, such as filtered-water dispensers in a refrigerator.

DETAILED DESCRIPTION

Figure 1:
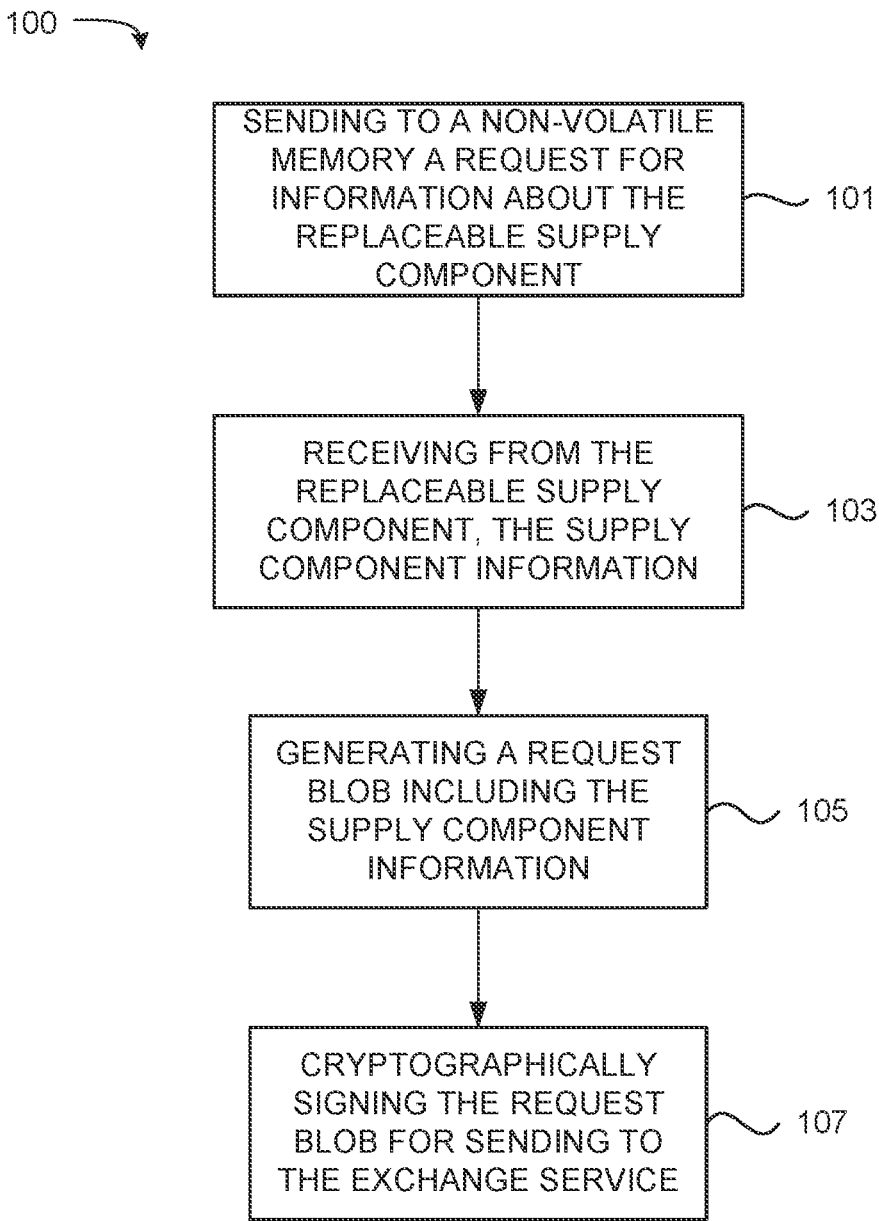
FIG. 1 illustrates an example method for generating a request for reprocessing of a replaceable supply component, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

It may be desirable to enable the reprocessing of computing supplies in a way that is secure, manageable for tracking and billing, and maintains security and authentication standards. As used herein, a reprocessed computing supply refers to or includes a computing supply that was previously used and has been restored, refilled, or otherwise made available for use again. As a non-limiting example, a reprocessed computing supply may include a print cartridge that has been refilled such that the cartridge may be used again rather than being disposed of. A computing supply may be referred to herein as a supply component, as well as a replaceable supply component.

Previously, computing supplies that were reprocessed were not reprocessed in a manner that is secure, manageable for tracking and billing, and in a manner that maintains security and authentication standards. For instance, such reprocessed computing supplies were not equipped with a consumables management feature, resulting in an inability to reset ink levels or toner gas gauges. Similarly, third party chips often use auto-resetting chips or other solutions that may not be compatible with the original manufacturer's authentication solutions and may expose the computing supply to security vulnerabilities.

Generating a request for reprocessing of a replaceable supply component, in accordance with the present disclosure, allows for secure reprocessing of a computing supply (e.g., a supply component). The present disclosure describes various components and means for secure reading and writing to a chip of the supply component, as well as a portal that accepts, processes and responds with new data to enable the reprocessing of the supply component. Additionally, the present disclosure describes various aspects of chip data partitioning, data management, and authentication to enhance security. Using this approach, a manufacturer can augment data on the original supply component chip to provide a more feature rich experience.

An example method, consistent with the present disclosure, includes sending to a non-volatile memory of a replaceable supply component, a request for information about the replaceable supply component. The method may include receiving from the replaceable supply component, the supply component information, wherein the supply component information includes data to be decrypted by an exchange service. The method further includes generating a payload envelope including the supply component information, and cryptographically signing the payload envelope for sending to the exchange service for reprocessing of the replaceable supply component.

An example computing device of the present disclosure includes a non-transitory computer-readable storage medium comprising instructions that when executed cause the computing device to perform various actions. For instance, the non-transitory computer-readable storage medium may comprise instructions that when executed cause the computing device to establish a key with a chip of a replaceable supply component using a KDF derived key, and generate a request blob including a request to reprocess the replaceable supply component using the computing device, the request blob having a plurality of attributes, each attribute being of a particular data type. The instructions may cause the computing device to cryptographically sign the request blob, and send the request blob to an exchange service.

As a further example, a computing device of the present disclosure includes a non-transitory computer-readable storage medium comprising instructions that when executed cause the computing device to generate a request blob including a request to reprocess a replaceable supply component using the computing device, the request blob having a plurality of attributes, each attribute being of a particular data type, and cryptographically sign the request blob. The non-transitory computer-readable storage medium may further comprise instructions that when executed cause the computing device to send the request blob to an exchange service, and receive a response blob from the exchange service, the response blob having a plurality of attributes, each attribute being of a particular data type.

As described herein, an encoding device may provide a block of supply data to be verified by the exchange service and the exchange service may provide a signed block of data to write back onto the supply component. As used herein, an encoding device refers to or includes a computing device capable of receiving a supply component, and writing data to a non-volatile memory disposed within the supply component. A non-limiting example of an encoding device includes a printer, which is capable of writing data to a print cartridge disposed therein, and of communicating with an exchange service. As used herein, an exchange service refers to or includes a local or cloud-based service capable of receiving requests for reprocessing of a supply component, and responding with data to be written to the non-volatile memory of the supply component. Each binary large object ("blob") of data provided by the encoding device to the exchange service, and provided by the exchange service to the encoding device, may contain a variety of contextual information, supply identifiers, and other data.

Turning now to the figures, FIG. 1 illustrates an example method 100 for generating a request for reprocessing of a replaceable supply component, in accordance with the present disclosure. Although not illustrated in FIG. 1, the method 100 may begin with receipt of a replaceable supply component in an encoding device, as described herein. The encoding device may be any form of computing device capable of receiving a replaceable supply component, and writing data to the replaceable supply component. Non-limiting examples of an encoding device include a printer, a household appliance (such as a refrigerator, a dish washer, a washing machine, etc.) and industrial manufacturing devices. The replaceable supply component may be a device used by the encoding device and capable of refilling and/or re-use. Non-limiting examples of a replaceable supply component include a printer cartridge for ink, toner, and/or 3D printing substrates, filtration systems and/or cleaning systems for household appliances (such as carbon filters, mesh/fiber filters, washing detergent, finishing coatings, etc.), and chemical dispensing cartridges for industrial manufacturing devices. The present disclosure is not limited to the examples described herein, and an encoding device may be any computing device capable of writing data, and a replaceable supply component may be any apparatus capable of coupling with and/or communicating with the encoding device and storing a replaceable supply of any type.

The encoding device may include a plurality of different components. For instance, the encoding device may include a network component capable of sending and receiving communications to and/or from a network (e.g., a cloud component), a key derivation function (KDF) component capable of generating KDF derived keys, and an exchange component capable of generating data packets for receipt by an exchange service as well as receiving data packets sent by the exchange service.

Figure 2:
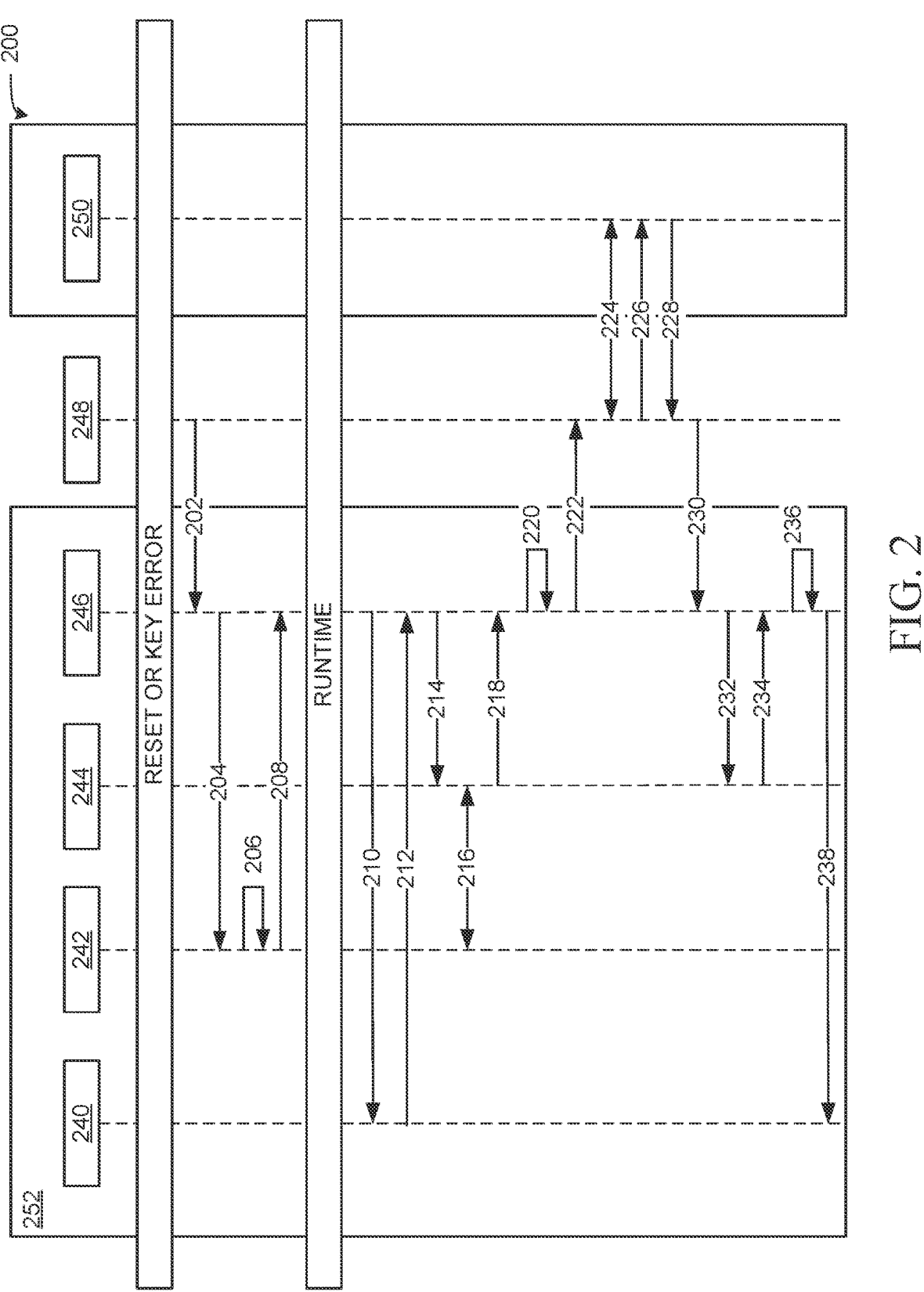
FIG. 2 illustrates an example method for generating a request for reprocessing of a replaceable supply component, in accordance with the present disclosure.

As illustrated, the method 100 may include sending to a non-volatile memory of a replaceable supply component, a request for information about the replaceable supply component, at 101. The non-volatile memory of the replaceable supply component may be a dedicate memory element controlled by an external controller or memory attached to an on board microcontroller, among other examples. For instance, as illustrated in FIG. 2, the exchange component of the encoding device may request from the non-volatile memory of the replaceable supply component, information about the replaceable supply component. The requested information may contain supply identifiers, supply data, and any other data that will be used by the encoding device to create a request blob for the exchange service.

At 103, the method 100 further includes receiving from the replaceable supply component, the supply component information. The supply component information may include data to be decrypted by the exchange service. In some examples, the supply component information may include structured and potentially unstructured data. For instance, a top level protocol (e.g., structured data) may be used, regardless of what type of supply component is reprocessed, with other unstructured data added to the top level protocol to complete a request blob.

The supply component information, received by the encoding device from the supply component, may be formatted in a particular data format. For instance, the supply component information may be formatted as a JavaScript Object Notation (JSON) object and expressed as a string. The individual attributes in the object may be expressed as American Standard Code for Information Interchange (ASCII) strings, the interpretation of which may be agreed upon based on the data encoded. Examples are not so limited, however, and attributes in the object (e.g., the supply component information) may be expressed as hexadecimal strings, decimal integers, or any other format. While various examples of the present disclosure describe formatting blobs using JSON, examples are not so limited. Any number of data formats may be used including CSV, xml, html, and C#, among others.

The supply component information, received by the encoding device from the supply component, includes a plurality of different attributes, each of which is formatted in a particular data format. As a non-limiting example, the supply component information may include a version, device information, a unique identifier for the supply component, a request diversifier, a counter, a platform, a chip schema identifier, supply data, and a previous status.

The version attribute includes a string representing the version of the data blob structure of the format "1.X." In some examples, the version is written in ASCII string, though examples are not so limited. The device information attribute includes a structure within the blob to describe the metadata surrounding the encoding device. The device information may be written as a JSON object, though examples are not so limited. Non-limiting examples of attributes of the device information include device unique identifier, a firmware version, a serial number, and a product number. The device unique identifier attribute may include a unique identifier for the encoding device generating the request. This may be a hardware security identifier or some other identifier than can be used to track an encoding device over time. The device unique identifier may be formatted as a hexadecimal string. The firmware version attribute may include a version of the firmware running on the encoding device and may be formatted as an ASCII string. The serial number attribute may include a reported serial number of the encoding device, and may be formatted as an ASCII string. The product number attribute may include a product SKU number for the encoding device, and may be formatted as an ASCII string.

The unique identifier for the supply component includes a supply identifier for a given platform. For instance, a particular supply component may have a first supply identifier for use with an inkjet printing platform, and a second supply identifier for use with a laser printing platform. The unique identifier for the supply component may be expressed as an ASCII string, though examples are not so limited. The request diversifier attribute may include an arbitrary decimal integer that is different between multiple requests. The request diversifier may be a timestamp, a counter, or a blend of other data, but is unique between requests. The counter attribute includes a number of times that the supply component has previously been reprocessed, and may be provided by the supply component. In various examples, the counter attribute is expressed as a decimal integer.

The platform attribute may be used to identify the technology the supply data is encoded in, and therefore the general format of the supply component data. The platform attribute may be written as an ASCII string, and include an indication of the type of technology. For instance, the platform attribute may include a first notation type to indicate that the supply component is for inkjet printing, and the supply component data is written for an inkjet printer. As another example, the platform attribute may include a second notation type to indicate that the supply component is for laser printing, and the supply component data is written for a laser printer.

The chip schema identifier may be used to indicate a template that the exchange service will use to decode the data in the request blob. Put another way, for a given chip type, a codex may be used to ingest the data. Within the platform, the chip schema identifier may indicate what template or set of templates to choose from when decoding the supply data. In various non-limiting examples, the chip schema identifier may be written as a decimal integer.

The supply data attribute may be platform and product specific. For instance, ink products populate data specific for an inkjet platform, and laser products populate data specific for a laser printing platform. Within each of these is a platform-specific structure, described below. One type of supply data attribute may be present in the blob. The supply data attribute may be formatted as a JSON object, though examples are not so limited.

The previous status attribute may include an acknowledgement of a previous supply's successful reprocessing. The previous status attribute may be formatted as a JSON object. Attributes of the previous status include a unique identifier for the previously reprocessed supply component, a request diversifier for the previously reprocessed supply component, and a reprocessing status for the previously reprocessed supply component.

As described above, the unique identifier for the previously reprocessed supply component includes a supply identifier for a given platform. For instance, a particular supply component may have a first supply identifier for use with an inkjet printing platform, and a second supply identifier for use with a laser printing platform. The unique identifier for the previously reprocessed supply component may be expressed as an ASCII string, though examples are not so limited. The request diversifier for the previously reprocessed supply component attribute includes an arbitrary decimal integer that is different between multiple requests. The reprocessing status for the previously reprocessed supply component includes a status mapping into an error code table that reflects whether or not the previous response blob was reprocessed.

As described herein, the supply data attribute of a supply component object may be platform and product specific. For instance, ink products populate data specific for an inkjet platform, and laser products populate data specific for a laser printing platform. Within each of these is a platform-specific structure. For instance, attributes of an inkjet supply data object may include a template major, a base key table, a data store, a challenge length, and partition data. The template major includes an integer representing the template version. The base key table attribute, data store attribute, and challenge length attributes may include a Base64String that is used for signature validation. The partition data attribute may include raw partitions from the supply memory device. Data contained in the partition data attribute may be parsed with a corresponding supply template, which can be looked up using the chip schema identifier and template version.

Attributes of a laser supply data object may include cryptographic elements, a last used date, an install date, protected, and reused, count. The cryptographic elements attribute includes cryptographic elements and/or digital signatures to establish trust and may in some examples be formatted as a 192 Byte string. The last used date attribute may include a date when the supply was last used and may be formatted as 4 Bytes as a date code. The install date may include an immutable install date of the cartridge, which may be blank in certain circumstances. The install date may be formatted as 4 Bytes as a date code. The protected property attribute may include data on if an anti-theft protection feature was activated by the user for the corresponding supply component. The protected property attribute may be formatted as a 2 Byte integer. If the protected property attribute is 0 that indicates that the supply component was not protected. The reused attribute may include data showing that the supply component is reused. The reused attribute may be formatted as a 1 Byte integer. The count attribute may include an indication for the number of reprocessing events the supply component has experienced, as reported by the exchange service. The count attribute may be expressed as a Base64 encoded bit field. Other attributes may be included in the laser supply data object. For instance, different and/or additional attributes that include usage history data and/or feature settings may be included.

Once the supply component information is received from the supply component and by the exchange service component of the encoding device, the supply component information is packaged for sending to the exchange service. Accordingly, in response to receiving the supply component information from the replaceable supply component, the method 100 may include generating a KDF derived key. To generate the KDF derived key, the exchange service component of the encoding device may send a request to a KDF derived component of the encoding device. As described with regards to FIG. 2, the KDF derived key component may return to the exchange service component, the generated KDF derived key.

As illustrated in FIG. 1, the method 100 further includes generating a request blob including the supply component information at 105. The request blob may include a header and a payload, and in some examples may be a JSON web exchange (JWE) data structure. The header may include a description of the cryptographic operations and parameters employed by the blob. In various examples, the header is a JOSE (JSON Object Signing and Encryption) header. The payload of the request blob includes the message to be secured (the supply component information).

The parameters of the JOSE header may include zip, jti, iat, exp, kid, identityP1, and identityAckP1. The zip header is used for communication optimization, and includes a value of "DEF" indicating that payloads are compressed before encryption. The jti header includes a JWT ID to detect replays. As used herein, a replay refers to or includes a repeated reprocessing request. The iat header includes an "issued at" timestamp. The exp header includes an expiration timestamp. The kid header includes key ID. The identityP1 header includes an indication of Identity Envelope version 1, which reflects a first time registration of the encoding device with the exchange service, or renewal of a registration of the encoding device with the exchange service if an error occurred. The identityAckP1 header includes a confirmation that the encoding device is registered with the exchange service and that the current master key can be used. Once a master key has been established between the encoding device and the exchange service and until it is revoked, the request blob will not include "identityP1" nor "identityAckP1".

KDF derived keys, used at various points in sending and receiving blobs, rely on a master key. Key establishment may be performed by registering the encoding device with a key registration service. The key registration service replies with an envelope payload called "entity_config". This envelope may be provided back to the encoding device in the "identityAckP1" property. After registration, the exchange service queries the key registration service for KDF derived keys.

In instances where the encoding device was reset to factory default, the encoding device was unable to process the exchange service to encoding device blob because of an unknown masterKeyId error, the encoding device was unable to process the exchange service to encoding device blob because of a signature validation error, or the encoding device was unable to process the exchange service to encoding device blob because of an identityAck envelope validation error. In such instances, the encoding device may send to the exchange service, a blob containing the identityP1 envelope in the JOSE header to establish a new Envelope Master Key.

The kid attribute in the JOSE header changes based on whether the message is going from the encoding device to the exchange service, or from the exchange service to encoding device. For communications from the encoding device to the exchange service, the kid attribute in the JOSE header follows the format

```
com.hp.cdm.platform.avatar # CRLF added for readability
.keyType.otp_hkdf_sha2_aes128
.masterKeyId.<base64URL of Envelope Master Key ID>
.deviceProductUniqueID.<lowercase hyphenated device
PRODUCTUNIQUEID> .serviceName.svc_supply_encoding
.keyIndex.<KDF key index>
```

The masterKeyId attribute may be generated by the firmware of the encoding device, during the Identity Envelope generation (as discussed with regards to FIG. 2), and may be Base64URL encoded. The deviceProductUniqueID attribute may be a unique identifier for the encoding device, and may be lowercase and hyphenated. The serviceName attribute is "svc_supply_encoding". The keyIndex may be an incrementing index to generate one time AES keys. As communications from the encoding device to the exchange service, and from the exchange service to the encoding device, both utilize a key index, the key indexes for encoding device to the exchange service communications increment independently from key indexes for exchange service to the encoding device communications.

For exchange service to the encoding device communications, the kid attribute in the JOSE header follows the format:

```
com.hp.cdm.platform.avatar # CRLF added for readability
.keyType.otp_hkdf_sha2_aes128
.masterKeyId.<base64URL of Envelope Master Key ID>
.serviceName.svc_supply_encoding
```

-continued

```
.deviceProductUniqueID.<lowercase hyphenated device
PRODUCTUNIQUEID>
.keyIndex.<KDF key index>
```

As with the kid attributes for communications from the encoding device to the exchange service, the masterKeyId attribute may be generated by the firmware of the encoding device, during the Identity Envelope generation (as discussed with regards to FIG. 2), and may be Base64URL encoded. The deviceProductUniqueID attribute may be a unique identifier for the encoding device, and may be lowercase and hyphenated. The serviceName attribute is "svc_supply_encoding". The keyIndex may be an incrementing index to generate one time AES keys. As communications from the encoding device to the exchange service, and from the exchange service to the encoding device, both utilize a key index, the key indexes for encoding device to the exchange service communications increment independently from key indexes for exchange service to the encoding device communications.

At 107, the method 100 further includes cryptographically signing the request blob for sending to the exchange service for reprocessing of the replaceable supply component. In various examples, cryptographically signing the request blob includes creating the request blob using a KDF derived key, as described further with regards to FIG. 2. The payload encryption and signing may be based on Authenticated Encryption with AES128-GCM, and the encryption key may rotate with every payload.

In various examples, the request blob is provided to the exchange service for reprocessing of the replaceable supply component. As the process described herein may be performed in a web-based system or without a network connection, the method 100 may include providing the request blob for copy and paste in web browser, and/or providing the request blob to the exchange service directly via a network connection.

FIG. 2 illustrates an example method 200 for generating a request for reprocessing of a replaceable supply component, in accordance with the present disclosure. FIG. 2 illustrates a time-lapse sequence of communication between an encoding device 252, a user 248, and an exchange service 250. As briefly described with regards to FIG. 1, the method 200 may begin when the first transaction after a reset or a key error begins. In this process, before runtime, an identity envelope is generated.

At 202, the method 200 includes a user 248, via a browser, sending a query for information about the replaceable supply component to the exchange component 246 of the encoding device 252. At 204, the method 200 includes the exchange service component 246 of the encoding device 252 sending to a network service component 242 of the encoding device 252, a request for an identity envelope.

In response to receipt of a request for an identity envelope, the network service component 242 of the encoding device 252 may create a master key at 206. In response to generating the master key, the network service component 242 of the encoding device 252 may send the identity envelope back to the exchange service component 246 of the encoding device 252 at 208.

Once the exchange service component 246 of the encoding device 252 has obtained the identity envelope, the process continues at runtime, as illustrated. The method during runtime is discussed more specifically with regards to FIG. 1. At 210, the method 200 includes the exchange service component 246 of the encoding device 252, sending a request to the replaceable supply component 240 for supply component information. For instance, as described at 101 in FIG. 1, the exchange service component may send to a non-volatile memory of the replaceable supply component, a request for information about the replaceable supply component. In response to receipt of the request for information about the replaceable supply component, the replaceable supply component 240 responds to the exchange service component 246 of the encoding device 252 at 212, with the requested information about the replaceable supply component. For instance, as described at 103 in FIG. 1, the method 200 includes receiving from the replaceable supply component, the supply component information, wherein the supply component information includes data to be decrypted by an exchange service at 103.

In response to receipt of the information about the replaceable supply component at 212, the exchange service component 246 of the encoding device 252 requests from a KDF derived component 244, a KDF derived key at 214. In various examples, a key may be established between the non-volatile memory of a replaceable supply component and the encoding device, using the KDF derived key. For instance, the KDF derived component 244, in collaboration with the exchange service component 246 of the encoding device 252, may derive a KDF derived key from the master key (generated at 206), at 216. At 218, the KDF derived component 244 returns to the exchange service component 246 of the encoding device 252, the KDF derived key. This KDF derived key may be used to cryptographically sign the request blob, as discussed herein.

At 220, the exchange service component 246 of the encoding device 252 creates the request blob. As described with regards to FIG. 1, the request blob includes the supply component information in the request blob content, and the identity envelope (generated at 208) in the request blob header. Once the request blob is created by the exchange service component 246 of the encoding device 252, the request blob is provided for the user 248 at 222. The user 248 may copy and paste the request blob into a browser for the exchange service 254. In some examples, the encoding device 252 sends the request blob directly to the exchange service 254.

In various examples, the method 200 includes the user 248 logging into the exchange service 250 at 224, and forwarding the request blob to the exchange service 250 at 226. Although FIG. 2 illustrates the user logging in at step 224 (e.g., after the request blob has been generated), examples are not so limited. The user may login to the exchange service 250 at any point during runtime.

At 226, the user 248 provides to the exchange service 250, the request blob. At 228, the exchange service 250 provides to the user 248, a response blob with reprocessing instructions. The encoding device 252 may receive the response blob from the exchange service 250. Regardless of how the encoding device receives the response blob from the exchange service, the response blob may include a plurality of attributes, each attribute being of a JSON data type. As described herein, examples are not limited to the JSON data format, and other data formats may be used.

At 230, the user 248 provides to the exchange service component 246 of the encoding device 252, the response blob received from the exchange service 250. At 232, the exchange service component 246 of the encoding device 252 sends a message to the KDF derived component 244 to obtain another KDF derived key. For example, in response to receipt of a response blob from the exchange service, the encoding device 252 may obtain a second KDF derived key. The KDF derived key generated at 234 is different than the KDF derived key generated at 218. At 234, the KDF derived component 244 returns to the exchange service component 246 of the encoding device 252, the KDF derived key. The exchange service component 246 of the encoding device 252, at 236, decrypts the reprocessing instructions. Put another way, in response to receipt of the second KDF derived key, the encoding device decrypts the response blob. At 238, the exchange service component 246 of the encoding device 252 sends to the replaceable supply component 240, the reprocessing instructions. In some examples, the reprocessing instructions append or amend data in the chip of the replaceable supply component to designate the replaceable supply component as a reprocessed supply component.

The response blob includes the same architecture as the request blob, and is specific for the type of supply component that is being reprocessed. For instance, if the supply component is an ink cartridge, the response blob includes a plurality of properties, which include signature data, write partition, and host provided data file. The signature data property includes a data block containing the reprocessing schema, a key ID, and a signature. The write partition property includes a binary representation of the raw data that needs to be written to the ink cartridge supply component. The host provided data file property includes one or more host provided data file blocks, as defined by the host provided data file specification. This parameter is optional as host provided data file functionality becomes available on the different platforms.

If the supply is a laser supply component, the laser reprocess data may include a plurality of properties. For instance, the laser reprocess data may include a count attribute that is represented on the supply component as a 3 bit field with each set bit indicating a remanufacture cycle. Other attributes may be included in the laser reprocess data. For instance, different and/or additional attributes that include a fill level, a number of reprocessing cycles, as well as a digital signature attribute may be included.

When describing the data to write back to the supply, the response blob may indicate what data is written to the supply component, as well as where on the supply component memory it should be written. The format of the write block may vary between technology platforms, but one option may look like the following: address1||length1||data1||address2||length2||data2| . . . .

Figure 3:
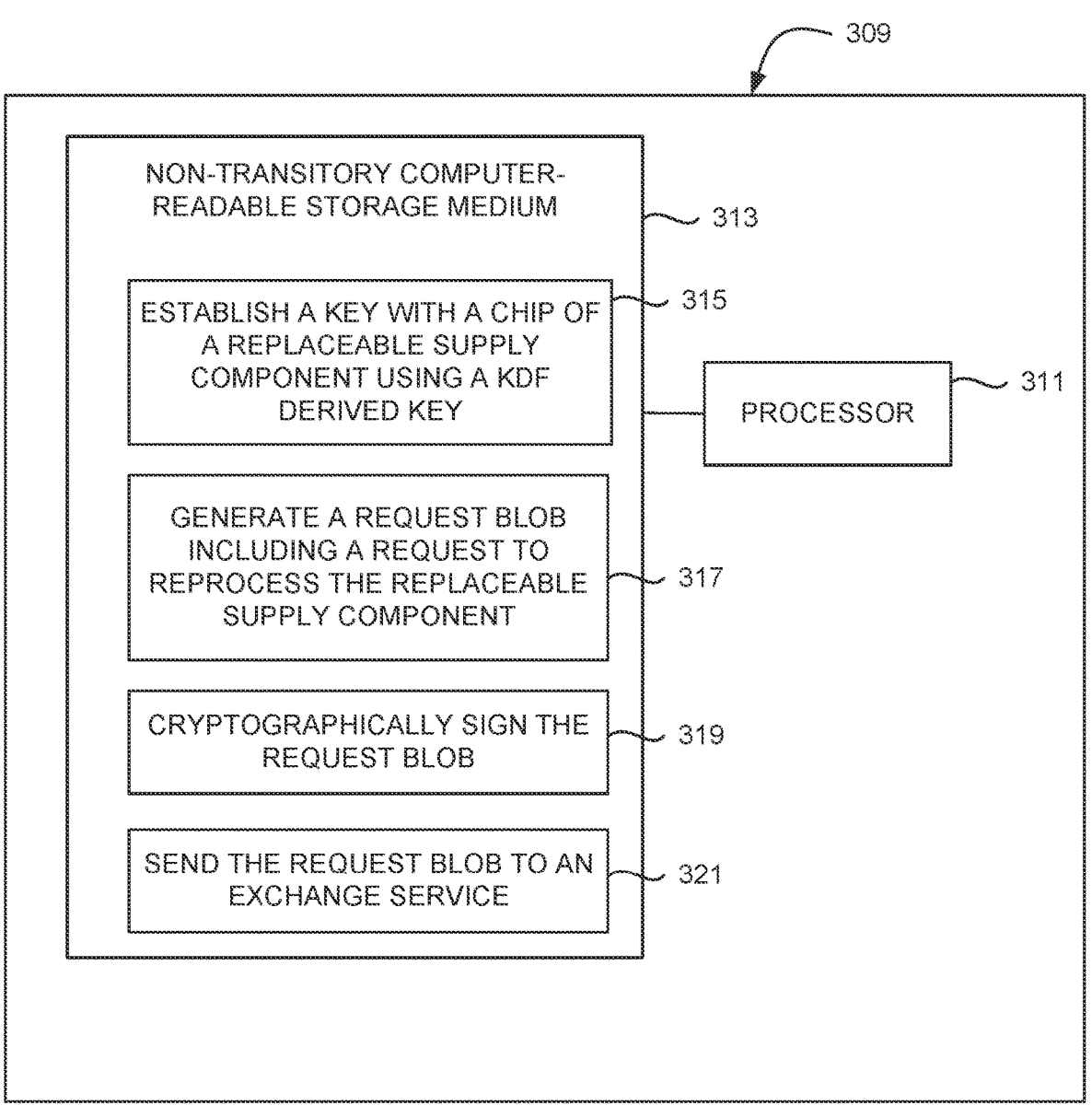
FIG. 3 illustrates an example block diagram of a computing device including instructions for generating a request for reprocessing of a replaceable supply component, in accordance with the present disclosure.

FIG. 3 illustrates an example block diagram of a computing device 309 including instructions for generating a request for reprocessing of a replaceable supply component, in accordance with the present disclosure. As illustrated in FIG. 3, the computing device 309 may include a processor 311, and a computer-readable storage medium 313. The computing device 309 may be similar to the encoding device 252 illustrated in FIG. 2. As such, the computing device 309 may perform the method 100 illustrated in FIG. 1, as well as method 200 illustrated in FIG. 2.

The processor 311 may be a central processing unit (CPU), a semiconductor-based microprocessor, and/or other hardware device suitable to control operations of the computing device 309. Computer-readable storage medium 313 may be an electronic, magnetic, optical, or other physical storage device that contains or stores executable instructions. Thus, computer-readable storage medium 313 may be, for example, Random Access Memory (RAM), an Electrically Erasable Programmable Read-Only Memory (EEPROM), a storage device, an optical disc, etc. In some examples, the computer-readable storage medium may be a non-transitory storage medium, where the term 'non-transitory' does not encompass transitory propagating signals. As described in detail below, the computer-readable storage medium 313 may be encoded with a series of executable instructions 315-321.

As illustrated, the computer-readable storage medium 313 may store instructions 315 that, when executed, cause the computing device 309 to establish a key with a chip of a replaceable supply component using a KDF derived key, as discussed with regards to FIG. 1 and FIG. 2.

The computer-readable storage medium 313 may store instructions 317 that, when executed, cause the computing device 309 to generate a request blob including a request to reprocess the replaceable supply component using the computing device, the request blob having a plurality of attributes, each attribute being of a particular data type. There could be any number of standard data formats supported including CSV, xml, html, and C#. As described herein the request blob may include an acknowledgement of successful receipt and encoding of a previous response blob.

The computer-readable storage medium 313 may store instructions 319 that, when executed, cause the computing device 309 to cryptographically sign the request blob, and instructions 321 that, when executed, cause the computing device 309 to send the request blob to an exchange service. In some examples, the computer-readable storage medium 313 includes instructions that, when executed, cause the computing device 309 to receive a response blob from the exchange service, the response blob having a plurality of attributes, each attribute being of a JSON data type.

Also as discussed with regards to FIG. 1 and FIG. 2, the computer-readable storage medium 313 may include instructions that, when executed, cause the computing device 309 to obtain a second KDF derived key in response to receipt of a response blob from the exchange service. In some examples, the computer-readable storage medium 313 includes instructions that, when executed, cause the computing device 309 to decrypt the response blob in response to receipt of the second KDF derived key. The computer-readable storage medium 313 may further include instructions that, when executed, cause the computing device 309 to append or amend data in the chip of the replaceable supply component to designate the replaceable supply component as a reprocessed supply component.

Figure 4:
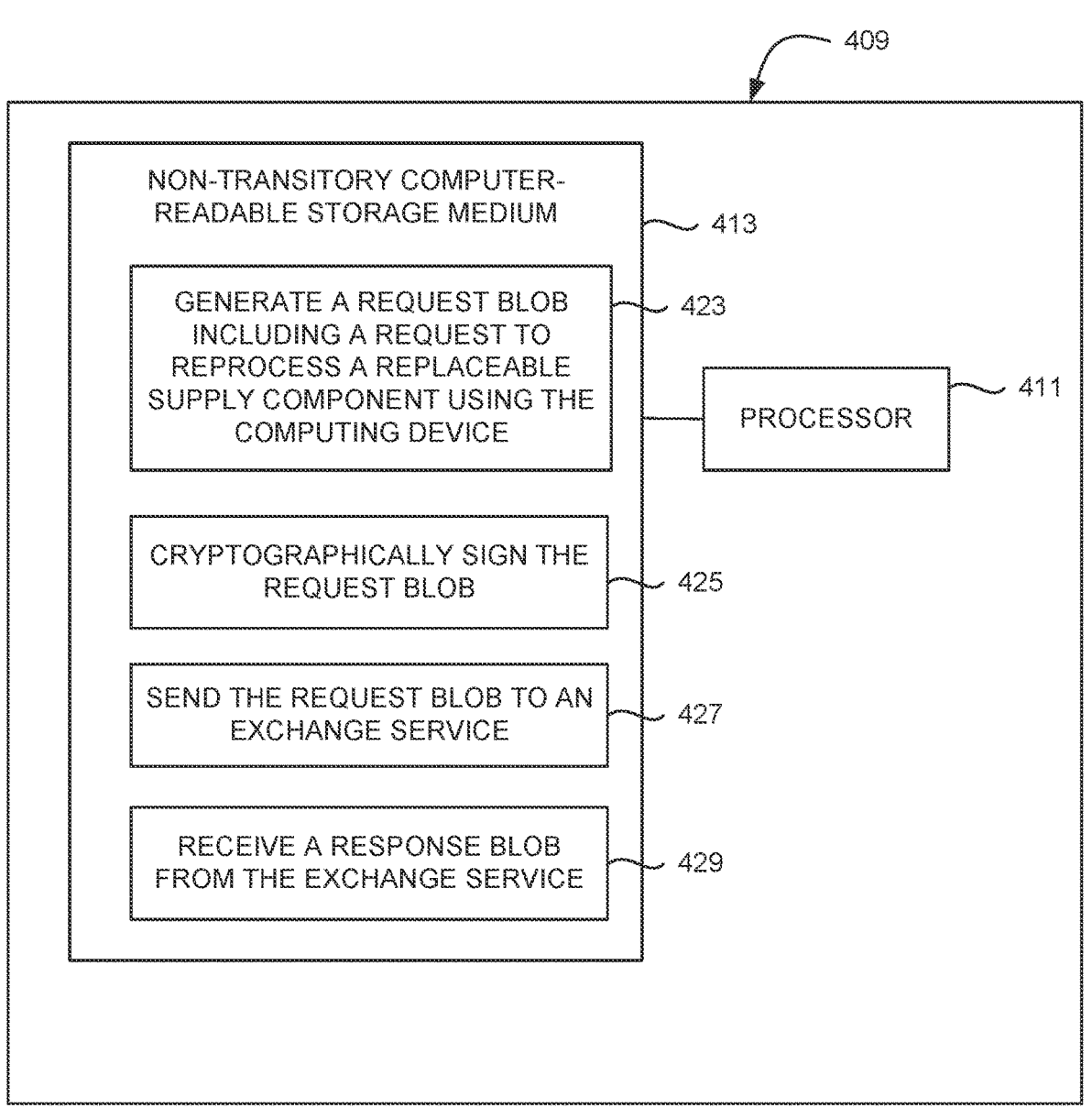
FIG. 4 illustrates an example block diagram of a computing device including instructions for generating a request for reprocessing of a replaceable supply component, in accordance with the present disclosure.

FIG. 4 illustrates an example block diagram of a computing device 409 including instructions for generating a request for reprocessing of a replaceable supply component, in accordance with the present disclosure. As illustrated in FIG. 4, the computing device 409 may include a processor 411, and a computer-readable storage medium 413. The computing device 409 may be similar to the computing device 309 illustrated in FIG. 3, and the encoding device 252 illustrated in FIG. 2. As such, the computing device 409 may perform the method 100 illustrated in FIG. 1, as well as method 200 illustrated in FIG. 2.

The processor 411 may be a central processing unit (CPU), a semiconductor-based microprocessor, and/or other hardware device suitable to control operations of the computing device 409. Computer-readable storage medium 413 may be an electronic, magnetic, optical, or other physical storage device that contains or stores executable instructions. Thus, computer-readable storage medium 413 may be, for example, Random Access Memory (RAM), an Electrically Erasable Programmable Read-Only Memory (EE-PROM), a storage device, an optical disc, etc. In some examples, the computer-readable storage medium may be a non-transitory storage medium, where the term 'non-transitory' does not encompass transitory propagating signals. As described in detail below, the computer-readable storage medium 413 may be encoded with a series of executable instructions 423-429.

As illustrated, the computer-readable storage medium 413 may store instructions 423 that, when executed, cause the computing device 409 to generate a request blob including a request to reprocess a replaceable supply component using the computing device, the request blob having a plurality of attributes, each attribute being of a particular data type. The computer-readable storage medium 413 may store instructions 425 that, when executed, cause the computing device 409 to cryptographically sign the request blob. The computer-readable storage medium 413 may store instructions 427 that, when executed, cause the computing device 409 to send the request blob to an exchange service.

The computer-readable storage medium 413 may store instructions 429 that, when executed, cause the computing device 409 to receive a response blob from the exchange service, the response blob having a plurality of attributes, each attribute being of a particular data type. In some examples, the computer-readable storage medium 413 may store instructions that, when executed, cause the computing device 409 to append or amend data in a memory chip of the replaceable supply component to designate the replaceable supply component as a reprocessed supply component.

In some examples, the computer-readable storage medium 413 may store instructions that, when executed, cause the computing device 409 to receive a response blob including an error identifier. In such instances, the computing device 409 may identify an error type from the response blob. For instance, the response blob may include an indication of an error, rather than reprocessing data for the supply component. The error blob may be subject to the same encapsulation methods used for the request and response blobs. The format for the error object includes a version, a device unique identifier, a unique identifier for the supply component, an original request diversifier, an error diversifier, an error status, and raw error data.

The version attribute includes a string representing the version of the error blob structure of the format "1.X". The unique identifier includes a unique identifier for the encoding device generating the request. This may be a hardware security identifier or some other identifier than can be used to track a single encoding device over time. The unique identifier for the supply component includes an identifier for the supply component that is appropriate for the given platform. This may be different between inkjet products and laser printing products. The original request diversifier includes the request diversifier attribute of the request blob or response blob encountering an error on the encoding device. The error diversifier includes an approximate number of seconds since 1970 that this error blob was generated, or a counter of the number of error messages sent, which may allow for differentiation of otherwise duplicate blobs. The error status includes an encoding of the failure encountered that generated this blob. And the raw error data includes any error-related data a firmware developer may find useful for debugging issues with the encoding device. This error-related data may vary between platforms and products, and in some instances may be left blank.

Error codes may be shared across product platforms and families, so a common enumeration may be used to identify an error type. Various errors may include but are not limited to 'ok', 'badSignature', 'wrongConsumable', 'wrongRequest', 'failedWrite', 'missingSupply', 'failedRead', 'noEngineResponse', 'attributeMismatch', 'unknownEngine', 'remanDataVerificationFailed', 'remanDataParsingError', and 'remanDataInvalid'. The ok error indicates no error was identified, data was unwrapped and written to the correct supply component successfully. The badSignature error indicates the received response blob could not be authenticated. The wrongConsumable error indicates that the received blob was not intended for the currently inserted supply component. The wrongRequest error indicates that the received blob was intended for the supply component but had the wrong request diversifier. The failedWrite error indicates that the attempt to write the remanWriteBlocks failed and could not be recovered. The missingSupply error indicates that the attempt to read or write data failed because no supply was found to communicate with. The failedRead error indicates that the attempt to read data from the supply failed, although the supply can be detected. The noEngineResponse error indicates that the formatter-side cloud communication application has not received a response from the engine. The attrbuteMismatch error indicates that the received response blob did not contain the same supply and device identification data as the initial request. The unknownEngine error indicates that the engine encountered an error not described above. The remanDataVerificationFailed error indicates that an error was encountered decrypting the response blob. The remanDataParsingError error indicates that an error occurred parsing the response blob schema. The remanDataInvalid error indicates that an attribute in the response blob doesn't meet some expectation, such as a maximum number of allowed reprocessing events for this supply has been exceeded.

In various examples, the computer-readable storage medium 413 may store instructions that, when executed, cause the computing device 409 to, in response to identification of the error type, generate a second request blob including the request to reprocess the replaceable supply component using the computing device, cryptographically sign the second request blob, and send the second request blob to the exchange service.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:
1. A method, comprising:
sending, via an exchange service component of a printing device, a request for information about a replaceable supply component to a non-volatile memory of the replaceable supply component;
in response to sending the request for supply component information, receiving, at the exchange service component of the printing device, the supply component information from the replaceable supply component, wherein the supply component information includes data to be decrypted by an exchange service;
in response to receiving the supply component information, generating a request blob including the supply component information, the request blob including a header having an identity envelope for registration of the printing device with the exchange service;

in response to generating the request blob, cryptographically signing the request blob for sending to the exchange service for reprocessing of the replaceable supply component;
receiving, from the exchange service, a response with data to be written to the nonvolatile memory of the supply component, and;
writing, to the non-volatile memory of the replaceable supply component, by the printing device, the data to be written to the non-volatile memory of the supply component.
2. The method of claim 1, including in response to receiving the supply component information from the replaceable supply component, generating a key derivation function (KDF) derived key.
3. The method of claim 1, wherein cryptographically signing the request blob includes creating the request blob using a KDF derived key.
4. The method of claim 1, including providing the request blob for copy and paste in browser.
5. The method of claim 1, including providing the request blob to the exchange service.
6. A non-transitory computer-readable storage medium comprising instructions that when executed cause a computing device to:
establish a key with a chip of a replaceable supply component using a key derivation function (KDF) derived key;
generate a request blob including a request to reprocess the replaceable supply component using a printing device including the computing device, the request blob having a plurality of attributes, each attribute being of a particular data type, the request blob including a header having an identity envelope for registration of the printing device with the exchange service;
cryptographically sign the request blob;
send the request blob to an exchange service using an exchange service component of the printing device;
receive a response from the exchange service at the exchange service component of the printing device with data to be written to a non-volatile memory of the replaceable supply component, and;
write the data to a non-volatile memory of the replaceable supply component with the printing device.
7. The non-transitory computer-readable storage medium of claim 6, wherein
the response received from the exchange service is a response blob having a plurality of attributes, each attribute being of a JSON data type.
8. The non-transitory computer-readable storage medium of claim 6, wherein the request blob includes an acknowledgement of successful receipt and encoding of a previous response blob.
9. The non-transitory computer-readable storage medium of claim 6, including instructions that when executed, cause the computing device to:
in response to receipt of a response blob from the exchange service, obtain a second KDF derived key.
10. The non-transitory computer-readable storage medium of claim 9, including instructions that when executed, cause the computing device to:
in response to receipt of the second KDF derived key, decrypt the response blob.
11. The non-transitory computer-readable storage medium of claim 9, including instructions that when executed, cause the computing device to:

append or amend data in the chip of the replaceable supply component to designate the replaceable supply component as a reprocessed supply component.

12. A non-transitory computer-readable storage medium comprising instructions that when executed cause a computing device to:

generate a request blob including a request to reprocess a replaceable supply component using a printing device including the computing device, the request blob having a plurality of attributes, each attribute being of a particular data type, the request blob including a header having an identity envelope for registration of the printing device with the exchange service;

cryptographically sign the request blob;

send the request blob to an exchange service using an exchange service component of the printing device;

receive a response blob from the exchange service, the response blob having a plurality of attributes, each attribute being of a particular data type; and in response to receiving the response blob, append data in a memory chip of the replaceable supply component using the printing device.

13. The non-transitory computer-readable storage medium of claim 12, wherein append data in a memory chip of the replaceable supply component includes appending the data in the memory chip of the replaceable supply component to designate the replaceable supply component as a reprocessed supply component.

14. The non-transitory computer-readable storage medium of claim 12, including instructions that when executed, cause the computing device to:

receive a response blob including an error identifier; and identify an error type from the response blob.

15. The non-transitory computer-readable storage medium of claim 14, including instructions that when executed, cause the computing device to:

in response to identification of the error type, generate a second request blob including the request to reprocess the replaceable supply component using the computing device;

cryptographically sign the second request blob; and send the second request blob to the exchange service.

* * * * *